April 14, 1964

L. PEASE 3,128,860

POWER TAKEOFF UNIT

Filed Sept. 22, 1958

INVENTOR.
Lionel Pease
BY
Thomas W. Secrest
ATTORNEY

L. PEASE

3,128,860

POWER TAKEOFF UNIT

Filed Sept 22, 1958

INVENTOR.
Lionel Pease
BY
Thomas W. Secrest

ATTORNEY

April 14, 1964 L. PEASE 3,128,860
POWER TAKEOFF UNIT
Filed Sept. 22, 1958 11 Sheets-Sheet 5

*Fig. 5*

INVENTOR.
Lionel Pease
BY
Thomas W. Secrest

ATTORNEY

April 14, 1964  L. PEASE  3,128,860
POWER TAKEOFF UNIT
Filed Sept. 22, 1958  11 Sheets-Sheet 8

INVENTOR.
Lionel Pease
BY
Thomas W. Secrest
ATTORNEY

April 14, 1964 L. PEASE 3,128,860
POWER TAKEOFF UNIT
Filed Sept. 22, 1958 11 Sheets-Sheet 9

INVENTOR.
Lionel Pease
BY
Thomas W. Secrest
ATTORNEY

United States Patent Office 3,128,860
Patented Apr. 14, 1964

3,128,860
POWER TAKEOFF UNIT
Lionel Pease, 3526 Dawson, Seattle, Wash.
Filed Sept. 22, 1958, Ser. No. 762,356
12 Claims. (Cl. 192—4)

The present invention relates to a power takeoff unit for predetermining and controlling the angular movement of an operating shaft in both clockwise and counter-clockwise directions, and which angular movement may be translated into other forms of movement by means of appropriate mechanism. While the invention is not necessarily limited to use in a specific application such as a sawmill carriage control, the use in such an application illustrates the versatility and advantages of the power takeoff unit.

In the physical processing and the working of material there is provided a means for supporting and holding the material. This means may be stationary or may be ambulatory. Also, there is provided a tool for working the material. This tool may be stationary or ambulatory. Means are provided for moving the material and the tool with respect to each other. This movement is controlled so that upon each cycle a predetermined degree of working takes place. To accomplish this relative movement there is provided a power drive and to accomplish the control of the relative movement there is provided a control unit. The power drive will usually consist essentially of a motor means connected to an operating shaft either through a fast coupling or a clutch. In those instances where the material is relatively heavy there is provided a gear box between the power means and the shaft. Turning now to the control unit, this unit may control the clutch so as to arrest the motion of the operating shaft in a predetermined angular position. Also, for ease of operation, and in many instances both for speed and accuracy of operation, the control unit should be capable of being set for a declutching operation upon a predetermined angular movement of the shaft.

For purposes of illustration the present invention is described hereinafter with particular reference to sawmill setworks. As various other types of machines operate upon the same basic principle the specific reference to sawmill setworks is not intended as a limitation upon the scope of this invention.

A specific application of this invention is in the lumber industry and the sawing of lumber. The material in this instance is a log and which log is supported and held on said means. This means moves cooperatively adjacent to a tool, i.e., a saw. The support means or carriage is so constructed and arranged that after each successive swing operation the log is shifted toward the saw by a distance corresponding to the thickness desired for the next cut. Due to the large size and heavy weight of the log and carriage mechanism there is provided a power drive for effecting the shifting movements. The movements are controlled through means including a control unit, i.e., a setworks. Because commercial lumber thicknesses are standardized it is desirable that the increments of advancing movements of the log or cant toward the saw be accurately controlled in order to effect a maximum footage from the log.

Accordingly, an object of this invention is to provide a new and improved power takeoff unit for facilitating accurate control of adjustment effected through a power drive, and control unit therefor, between a support and holder for material and a tool.

A further object of this invention is to provide a new and improved setworks for indicating and predetermining the relative angular position of a driven operating shaft.

A principal object of the present invention is to provide a setworks whereby the operation of the sawmill carriage assembly may be controlled from the safety of a remote position.

A further object is the provision of a setworks in which adjustment for each succeeding cut of the log in which adjustment for each succeeding cut of the log is made merely by pressing properly identified buttons which both reduces operator errors and increases linear footage production of lumber from the mill.

An additional object of the invention is the provision of a power takeoff unit constructed of a minimum of parts and which is sturdily built for long operating life and capable of effecting rapid and precise adjustment of the operating shaft.

A general object of this invention is the provision of a power takeoff unit for controlling from a remote position the selective angular displacement of a rotary shaft.

Another object is to provide a power takeoff unit which is both quick in response and positive in operational direction.

An additional object is the provision of a power takeoff unit having a combination of pneumatic mechanical and electrical controls for reliability of operation and quick response.

A still further object is the provision of a sawmill setworks system having a wide range of predetermined cuts for logs.

An additional object is to provide a power takeoff system having means to preclude the incorporation of the control unit in the system until the control unit has been preset and is in a state to function.

Another object is to provide a sawmill setworks having means to insure the incorporation of the main power unit prior to incorporating the control unit in the setworks system so as to insure a more accurate cut of the log.

A still further and important object is the provision of a power takeoff unit which is relatively inexpensive to manufacture and to maintain.

Further objects and advantages of the invention will appear from the following description, taken in connection with the accompanying drawings, while the features of novelty characterizing the invention will be set forth with greater particularity in the appended claims.

Figure 1:
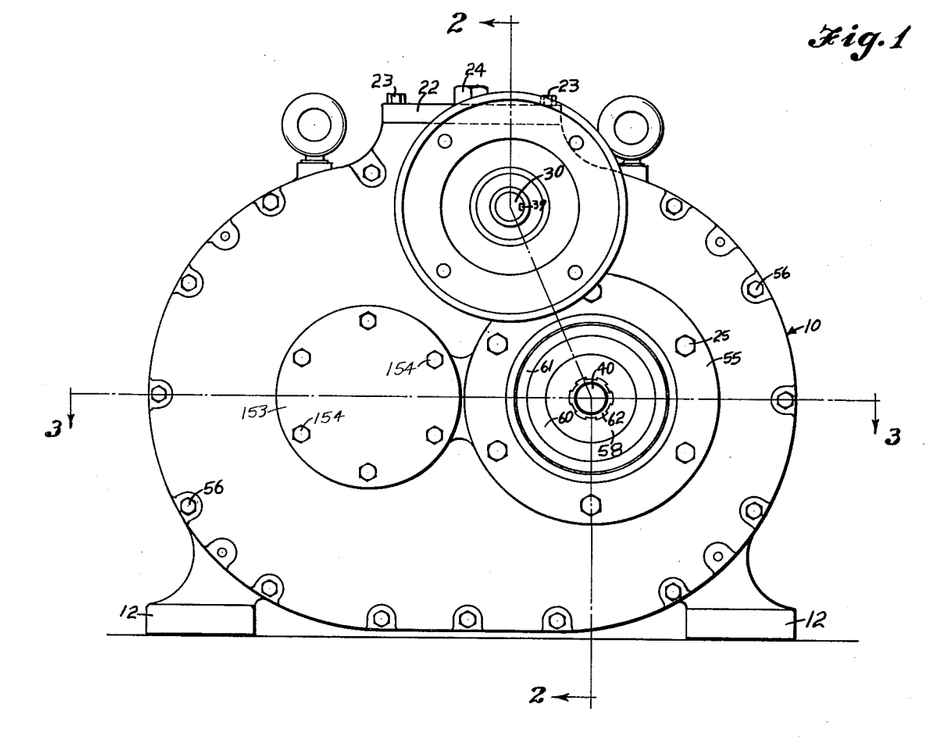
FIGURE 1 is an end-elevational view of the input end of the gear box.
Figure 2:
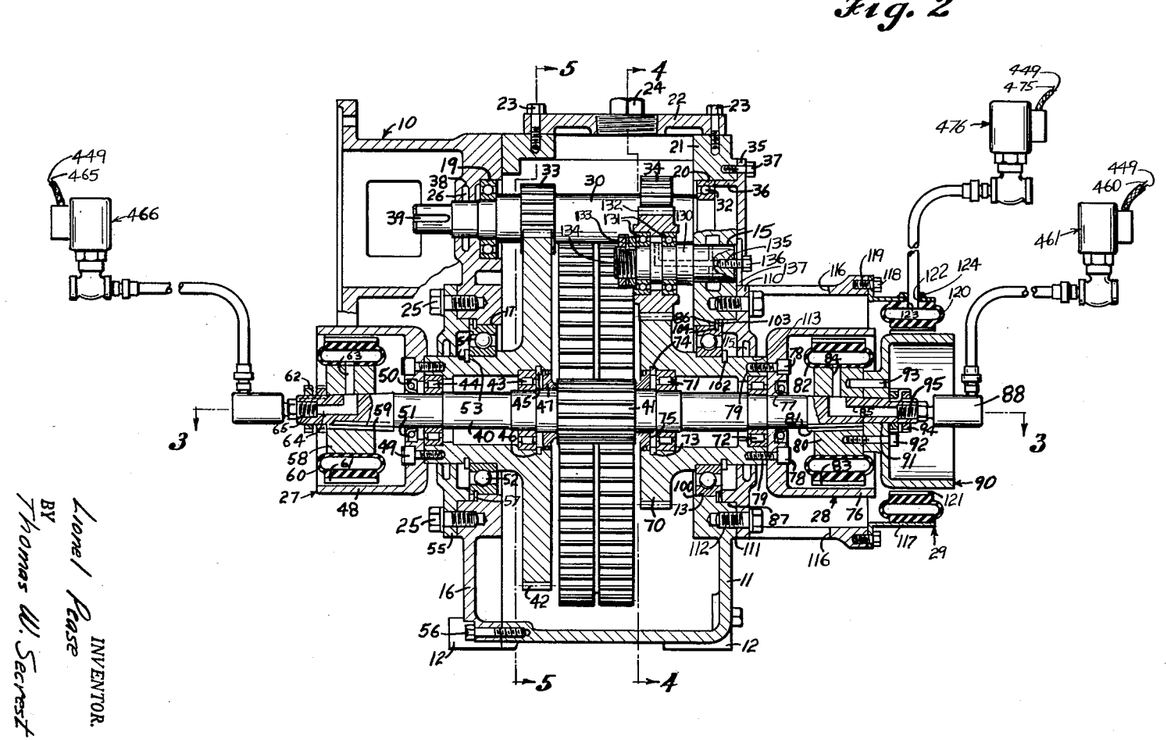
FIGURE 2 is a vertical, longitudinal cross-sectional view taken on line 2—2 of FIGURE 1, and illustrates the arrangement of input shaft, intermediate shaft and the gears interconnecting the two shafts.
Figure 3:
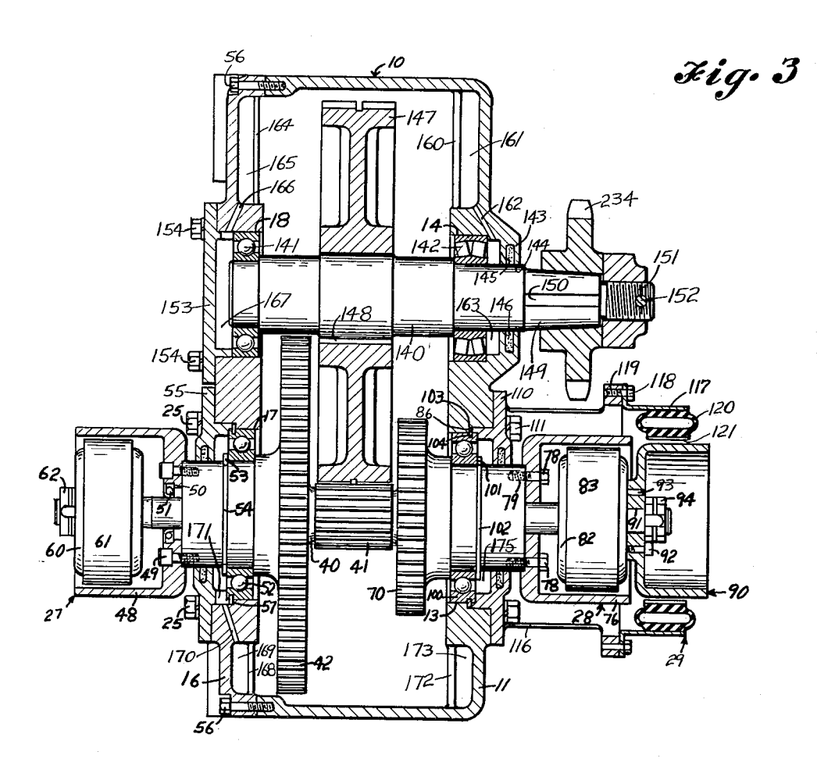
FIGURE 3 is a horizontal, longitudinal cross-sectional view taken on line 3—3 of FIGURE 1 and illustrates the arrangement of the intermediate shaft, the output shaft and the gears interconnecting with these two shafts.

Referring to the drawings it is seen that this invention comprises an instant-reversing speed reducer 10, comprising, in an endview, a box-like elliptical casing 11 laid on its side. This casing is supported by feet 12. In the casing proper is a circular opening 13 for receiving a bearing which will be described in more detail hereinafter. Also, in the casing proper is a circular opening 14 for receiving a self-aligning bearing, and a circular opening 15 to receive a stub shaft. Overlying the casing 11 is a cover 16 having a circular opening 17 therein for receiving a ball bearing. The openings 13 and 17 are in alignment. The cover 16 is attached to the casing 11 by means of bolts 56 in tapped openings in the casing. Also in the cover is a circular opening 18 for receiving the ball bearing. The openings 14 and 18 are in alignment. In the cover 16 is a circular opening 19 for receiving a ball bearing. In the casing 11 is a circular opening 20 for receiving a ball bearing. Circular openings 19 and 20 are in alignment. In the upper part of the casing 11 is a rectangular opening 21. Covering this opening is a coverplate 22 which is attached to the casing by means of bolts 23 in tapped openings in the casing. In the cover opening 22 is a access plug 24 in a tapped oil hole.

Reference numeral 30 denotes an input shaft journaled in bearing 31 in opening 19 in the cover and in bearing 32 in opening 20 in the casing proper. On this input shaft and integral with the input shaft 30 are pinions 33 and 34. In the opening 20 and covering the same is a cover 35 having ball bearing retaining prongs 36 pressing against ball bearing race 32. This cover is attached to the casing proper by bolts 37 in tapped holes in the casing. In the casing 11 and adjacent to the opening 19 is a circular groove 38 which is left open and functions as a labyrinth seal 26. On the input end of the shaft 30 there is a key way 39 to accept a coupling with the driving means.

Parallel to the shaft 30 and near the central part of the reducer 10 is an intermediate shaft 40 having therein an integral pinion 41. A spur gear 42 is rotatably mounted on the shaft 40 by means of roller bearings 43 and 44. The interior of the gear 42 is bored to receive both the bearings 43 and 44. Bearing 43 is retained in position by retainer ring 45 in circular groove 46 in the interior of the gear 42. Positioned between the retaining ring 45 and the integral pinion gear 41 is an oil seal 47. The bearing 44 is maintained in position on the gear 42 by means of a clutch drum 48 which is attached to the hub of the gear 42 by bolt 49 screwed into tap openings in said hub. This clutch drum is part of the clutch assembly 27. In a circular opening 50 of the clutch drum 48 is pressed an oil seal 51. Surrounding the hub of the gear and in the opening 17 of the cover 16 is a ball bearing 52. This bearing is held in position by means of a snap ring 53 in the circular groove 54 on the exterior of said hub. Also, the bearing 52 is maintained in position by means of a bearing retainer 55 attached to the cover 16 by means of bolts 25 in tapped openings in said cover. The bearing 52 is provided with a retainer ring 57 to prevent the bearing from being pushed too far into the cover. On the end of shaft 40 is mounted clutch hub 58 by means of a key 59. This clutch comprises an expandable member 60 which is in the configuration of a torus on the outside of the hub 58. Surrounding the expandable member 60 is a bearing surface 61 for frictionally bearing against the interior of clutch housing 48. The hub 58 is retained in place by means of lock nuts 62 on the threaded end of shaft 40. The hub 58 has a radial passageway 63 therein which communicates with longitudinal passage 64 in shaft 40. The end of the passage 64 is internally tapped at 65 to receive a rotating sleeve 69 for receiving air under pressure.

Rotatably mounted on shaft 40, but on the opposite side of pinion 41 with respect to gear 42, is gear 70. This gear has a hollow or cut-away central portion and is mounted on the shaft 40 by means of inner roller bearing 71 and outer roller bearing 72. Roller bearing 71 is held in position by snap ring 73 in circular groove 74 in the central part of the hub. An oil seal 75 is in the central part of the hub of the gear 70 between pinion 41 and bearing 71. A clutch drum 76, having a central circular opening 77 therein, is mounted by means of bolts 78 on the end of gear 70. These bolts are in tapped openings 79 in the end of the gear.

Mounted near this end of the shaft 40 is a clutch hub 80 which is retained in position by key 81. This clutch hub is part of clutch assembly 28. Surrounding the circumference of this clutch hub 80 is a flexible expandable member 82 in the configuration of a torus. This expandable member has a circumscribing friction bearing surface 83 thereon. In the clutch hub 80 is a radial passageway 84 which communicates with the interior of the expandable torus 82 and also with longitudinal passageway 85 in the end of the shaft 40.

Secured to the clutch hub 80 is a brake drum 90. This brake drum has a circular passageway 91 therein. The brake drum is secured to the hub 80 by means of bolts 92 and dowel pin 93. The clutch hub 80 and the brake drum 90 are retained on the end of the shaft 40 by means of lock nuts 94 which are screwed onto the end of the externally threaded shaft. The end of this shaft is tapped at 95 to receive a revolving intake fitting which assists in the introduction of air into the expandable torus 82.

In the opening 13 in the casing 11 is mounted a ball bearing 100. This bearing is pressed onto the gear 70 and is prevented from sliding axially off of the gear by means of snap ring 101 in external circular groove 102 in the hub of the gear. Also, the bearing is prevented from moving inwardly in the case by means of snap ring 103 in circular groove 104 in the bearing. This snap ring 103 on its inner face bears against shoulder 86 between the circular opening 13 and slightly larger circular opening 87 in the casing 11. Also, this bearing is retained partially in position by means of stand-off casting 110 which prevents the bearing from sliding outwardly in the opening 13 in the casing 11. This stand-off casting 110 is secured to the casing 11 by means of bolts 111 in tapped holes 112. The stand-off casting has a circular opening 113 for fitting around the hub of the gear 70 and in this circular opening is cut a groove 114 for receiving a belt dust seal 115.

This stand-off casting has a number of cut-outs 116 therein for decreasing the weight of the casting, and also to function as access openings. On the outer edge of the casting 110 is mounted a brake drum 117 which is part of brake assembly 29. This brake drum is mounted by means of bolts 118 in tapped holes 119. On the inner circumference of this brake drum is attached an expandable torus-like member 120. On the inner circumference of this expandable member 120 is a friction member 121 which is in the configuration of a circular band. In the brake drum 117 is an opening 122 which connects with an opening 123 in the outer wall of the member 120. Aligned with the openings 122 and 123 and on the external circumference of the brake drum 117 is a fitting 124 for receiving a connection from a source of air which is capable of expanding or inflating the member 120.

Figure 4:
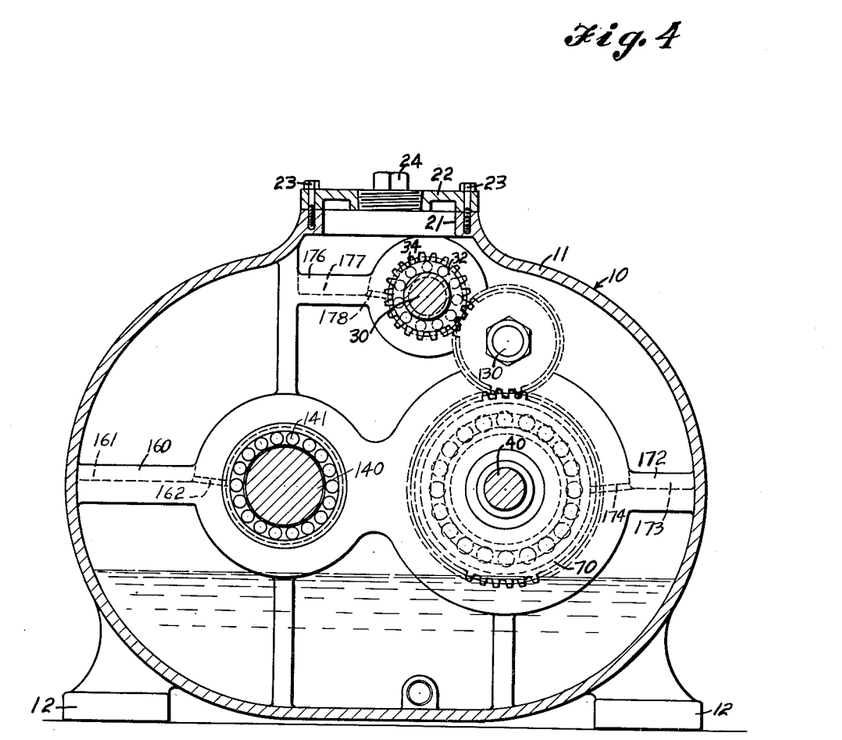
FIGURE 4 is a lateral, vertical cross-sectional view taken on line 4—4 of FIGURE 2 and illustrates the arrangement of the input shaft and a gear thereon, the intermediate shaft and a gear thereon, and an idler gear interconnecting said two gears.
Figure 5:
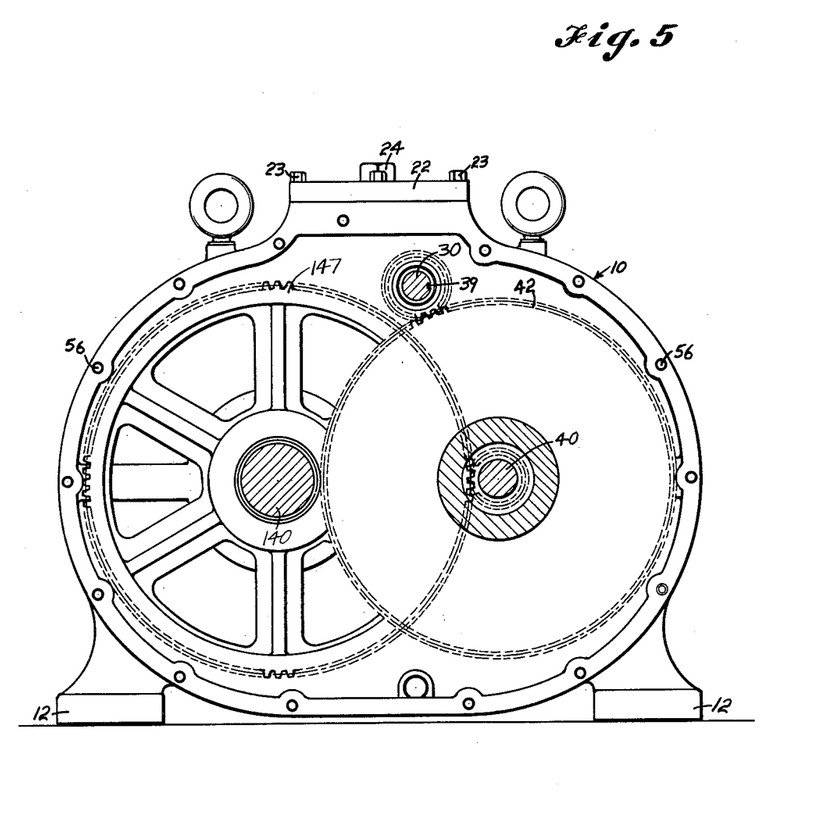
FIGURE 5 is a lateral, vertical cross-sectional view taken on line 5—5 of FIGURE 2 and illustrates the arrangement of the input shaft and a gear thereon, the intermediate shaft and a gear thereon, the output shaft and a gear thereon, and the intermeshing of said gears in a gear train.

In the opening 15 in the casing 11 is pressed a stub-shaft 130. On the inner end of this stub-shaft are two sets of spaced-apart ball bearings 131. Mounted upon these ball bearings is idler gear or an intermediate gear 132. The ball bearings and the gear 132 are prevented from moving off of the end of the stub-shaft 130 by means of lock nuts 133 screwed on the externally-threaded portion 134 of the shaft.

In the external end of the stub-shaft is a tapped opening 135 for receiving a bolt 136. The head of this bolt bears against a washer 137 which overlies the opening 15. This bolt and washer assist in preventing the stub-shaft 130 from working into the interior of the gear box.

An out-put shaft 140 is journaled in roller bearing 141 in opening 18 in cover 16, and is journaled in self-aligning bearing 142 in opening 14 in casing 11. The casing 11 also has a circular shoulder 143 having an opening 144 therein. The openings 144 and 14 are in alignment with respect to shaft 140. In the shoulder 143 is a circular groove 145 which is left open and functions as a labyrinth seal 146. Mounted on the central portion of the shaft 140 is a gear 147. This gear is locked on the shaft by means of a key 148. The gear 147 is a herringbone gear and meshes with pinion 41 on shaft 40. On the output end of the shaft 140 is a tapered shank 149 having a key way 150 therein. Also, on the extreme end of the shaft 140 is a threaded stub 151 having a diametrically drilled passageway 152 therethrough for securing a sprocket or a coupling.

Mounted over the opening 18 is a bearing retainer 153 for retaining bearing 18 in position. This retainer is mounted on the cover 16 by means of bolts 154.

The lubrication system for the gear box comprises a splash system in conjunction with a reservoir system. More particularly, referring to FIGURES 3 and 4, in the interior of the casing 11 is a wall 160 which in conjunction with said casing forms a reservoir 161. A passageway 162 slopes downwardly from this reservoir to an annular opening 163 surrounding shaft 140. The oil is picked up by shaft 140 and works its way through self-aligning bearing 142 back to the main oil reservoir. In the cover housing 16 is a wall 164 which in conjunction with said housing forms a reservoir 165. Sloping downwardly from this reservoir 165 is a passageway 166 which leads to an annular chamber 167 within the bearing retainer 153. The oil splashes into the reservoir 165, flows down passageway 166 and through roller bearing 141 and back into the main oil reservoir. Also, in conjunction with the cover housing 16 is a wall 168 which forms a reservoir 169. Sloping downwardly from this reservoir 169 is a passageway 170 which leads to an annular housing 171 within bearing retainer 55. The oil flows from this reservoir, through the passageway 170 into reservoir 171, through the ball bearing 52 and back into the main oil reservoir. Wall 172 in conjunction with housing 11 defines a reservoir 173. Sloping downwardly from this reservoir 173 is a passageway 174 which connects with an annular opening 175 defined by standoff casting 110 and bearing 100. The oil flows from the reservoir 173 through the passageway 174 and into the annular chamber 175 and from there through ball bearing 100 and back into the main oil reservoir. In FIGURE 4 it is seen that the casing 11 in conjunction with a wall 176 defines an oil reservoir 177. This reservoir connects by passageway 178 with an annular housing around shaft 30. The oil flows into this annular housing and through the bearings surrounding shaft 30 and back into the main oil reservoir.

The manner of operation of this unit is as follows. Assume that a source of power is supplied to end 39 of shaft 30. This source of power rotates the shaft 30 in only one direction. Assume that the output shaft 140 is standing still, i.e., is not rotating. In this state the expendable member 120 of the brake assembly 29 is expanded so as to contact brake drum 90. This prevents shaft 40 from rotating or it can be said that shaft 40 is at rest. Also, the expandable member 60 of the clutch assembly 27 is not expanded and the expandable member 82 of the clutch assembly 28 is not expanded. The shaft 30 is rotating and therefore the pinion gear 33 is rotating causing gear 42 on shaft 40 to rotate or idle. This in turn causes the clutch drum 48 to rotate. Also, the gear 34 on the shaft 30 is rotating causing the idler gear 132 to rotate and likewise gear 70 to rotate. Therefore, clutch housing 76 of clutch assembly 28 is also rotating. However, clutch housing 48 is rotating in a direction opposite to the direction of rotation of clutch housing 76.

Assume that the output shaft is to be driven in a forward direction. Then, the expandable member 120 of the brake assembly 29 is deflated by decreasing the air pressure therein. The braking action on the brake 90 is released to allow the shaft 40 to rotate. To rotate in the forward direction the expandable member 60 of the clutch assembly 27 is expanded so that the friction bearing surface 61 is in contact with the interior circumferential walls of the clutch housing 48. The shaft 30 is rotating and likewise the pinion 33 is rotating. This causes the gear 42 to rotate and the clutch housing 48 to rotate. In turn, through contact with the expanded member 60, the shaft 40 rotates and the pinion gear 41 rotates. This pinion gear 41 causes herringbone gear 147 on shaft 140 to rotate in the forward direction.

Assume that the output shaft is rotating in the forward direction but it is desired to rotate this shaft in the reverse direction. It is realized that the expanded member 120 of the brake assembly 29 is deflated so that the bearing surface 121 is not in contact with the brake drum 90. With the output shaft rotating in the forward direction it is first necessary to deflate expandable member 60 so as to disengage contact between the clutch housing 48 and the shaft 40 and also to inflate expandable member 120 so as to have contact between the shaft 40 and the brake drum 90 so as to positively stop the rotation of the shaft 40. Then, having stopped the rotation of the shaft 40, the expandable member 120 is deflated so as to disengage contact between it and brake drum 90 and, substantially simultaneously with only a slight time lag the expandable member 82 is expanded so as to have contact between it and clutch housing 76. Recapitulating the shaft 30 is rotating which causes gear 34 to rotate. The gear 34 causes idler 132 to rotate which in turn causes gear 70 to rotate. The gear 70 rotates causing clutch housing 76 to rotate. The clutch housing 76, through contact with the expanded member 82, causes the shaft 40 to rotate. The shaft 40 causes the pinion 41 to rotate. The pinion 41 meshes with the gear 147 causing it and the output shaft 140 to rotate. However, this time, because of the idler gear 13, the shaft 140 is rotating in the reverse direction.

Figures 6, 7:
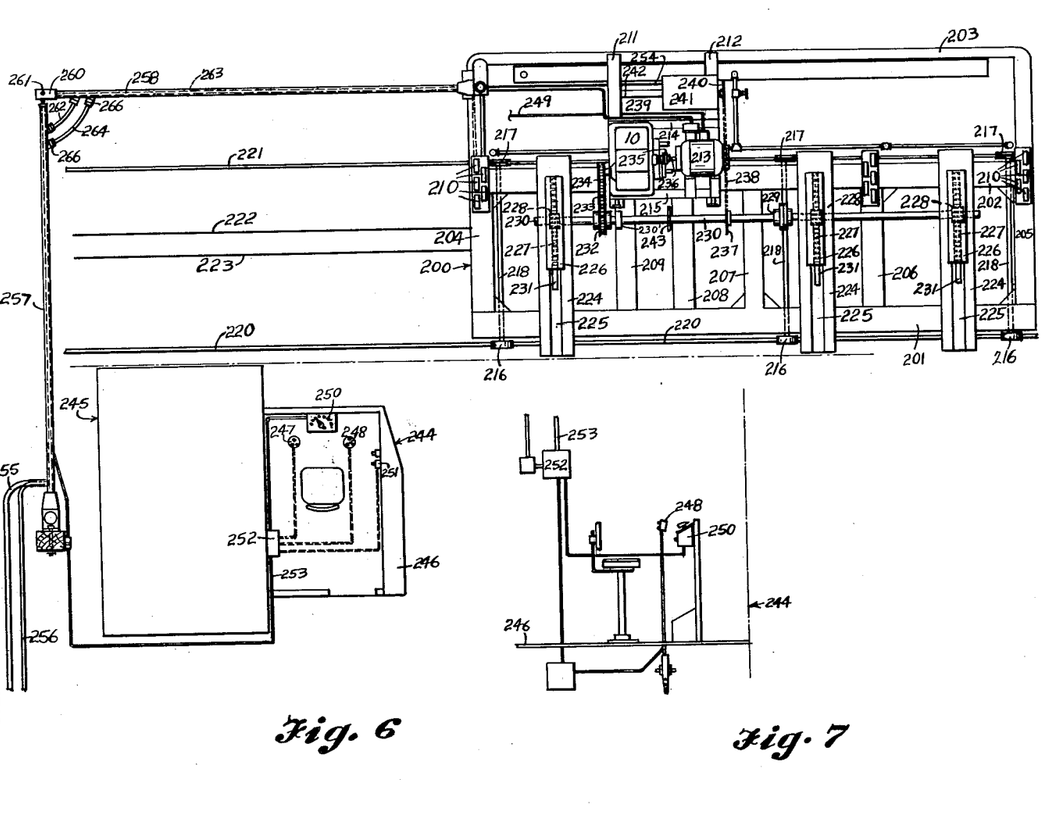
FIGURE 6 is a plan view of a sawmill setworks comprising the subject matter of this invention and the remote control station for the setworks.
FIGURE 7 is a side elevation view of the remote control station for the sawmill setworks.

The gear box 10 is carried on a sawmill carriage setworks 200. This setworks comprises three longitudinal frame members 201, 202 and 203. At the end of this carriage is a lateral end member 204 and at the other end of this carriage is a lateral end member 205. Running between the logitudinal members 201 and 202 are intermediate frame members 206, 207, 208 and 209. These intermediate frame members are substantially parallel to the lateral end members 204 and 205. Running between longitudinal members 202 and 203 are lateral members 211 and 212, and running between the lateral members 211 and 212 are longitudinal members 214 and 215. The gear box 10 and its driving motor 213 rest on a frame composed of the members 211, 212, 214 and 215. On the outside of member 201 and on the other side of member 202 are a plurality of wheels 216 and 217. The wheels 216 and 217 are connected by shafts 218. The wheels 216 ride on a carriage flat rail 220 and wheels 217 ride on a carriage V-rail 221. This carriage is drawn forwardly and rearwardly on these rails by cables 222 and 223, respectively, each of which is secured at one end to the framework and at the other end to a power winch (not shown).

Supported on this carriage between the members 201 and 202 are three spaced-apart head blocks 224. These head blocks have a guide channel 225 in the upper face for guiding an upstanding knee 226. The mechanism for actuating this knee comprises a rack 227 which co-acts with a pinion gear 228 on set shaft 230. One the forward upper edge of the knee 226 is a dog 231 for biting into the log and firmly positioning it on the head blocks 224. On the carriage are valves 210 for controlling the carriage dogs, tapers and other carriage functions. Intermediate the ends of the set shaft 230 is a bearing 230' braced by lateral member 209. A couple 229 couples together two sections of the set shaft. It is to be understood that there may be more or fewer than three head blocks depending on the carriage, and that a screw block or a chain driven block may replace rack 227.

Mounted on the shaft 230 and near one end is a sprocket 232. This sprocket is connected by means of a chain 233 to the sprocket 234 on the output shaft 140 of the gear box 10. By means of the sprockets 232 and 234 and the chain 233 it is possible to move the upstanding knees 226 in one direction on the head blocks 225 and also to move these knees in the reverse direction. The gear box is driven by the motor 213. The input shaft 30 of the gear box is coupled to the output shaft 236 of the motor 213 through flexible coupling 235.

Spaced substantially equidistantly between the ends of the set shaft 230 is a sprocket 237. This sprocket connects by means of a chain 238 to a sprocket 240 in the control or brain unit 241. The brain unit 241 is supported by the lateral member 212 and longitudinal members 242 and 239 running between members 211 and 212.

Spaced between the sprocket 232 and the sprocket 237 and on the set shaft 230 is a sprocket 243. Although not shown there may be a chain interconnecting sprocket 243 and an indicator dial for visibly indicating to the operator of the carriage the position of the log cut with respect to the position of the upstanding knees on the head blocks.

The control for positioning the log on the head blocks and for running the carriage toward the saw and away from the saw is at the sawyer's station 244. This sawyer's station is off of the carriage and is stationary. As illustrated in FIGURE 6 the sawyer station 244 is positioned next to hte head saw housing 245. The sawyer is positioned in a guard box 246 for safety purposes. At the sawyer's station are the controls for operating the sawmill carriage and for positioning the log on the head blocks. In this sawyer's box is a feed control lever 247 for moving the carriage toward and away from the saw. Also, there is a control box 248 for relocating the nigger. The control for positioning the log on the head blocks is 250 for automatic control, and 251 is for accessory control. These controls wil be more fully explained in the description of the control or brain unit 241. These controls 247, 248, 251 and 250 lead into a common wall junction box 252 by means of cables, not numbered. A multi-strand cable 253 leads out of this wall box and to a pantograph member for connecting with the sawmill carriage. This multi-strand unit splits into separate feeds 254 for the brain unit which also has the leads for both the automatic setting and the manual setting. Cable 249 carries the power to motor 213.

The air pressure for supplying the clutch unit in the gear box and valves 210 on the carriage comes through pipes 255 and 256. 255 becomes upper pipe 257 on the pantograph unit and 256 becomes the lower pipe on the pantograph unit. The multi-strand cable 253 is attached to pipe 257. One end of this pipe, 257, is pinned to pipe 258 by means of a self-aligning rod end bearing 260 and a pin 261 on 257. The lower pipe 256 is pinned to pipe 265 by means of the self-aligning rod and bearing 260 and the pin 261. Actually, the bearings 260 and 261 are for end supports for these pipes. A flexible connector 262 connects upper pipe 257 with upper pipe 258, and a flexible connector 264 connects lower pipe 256 with lower pipe 263. The flexible connectors 262 and 264 are connected with the pipes 256, 257, 258 and 263 by means of couples 266.

Figures 8, 11, 12, 13:
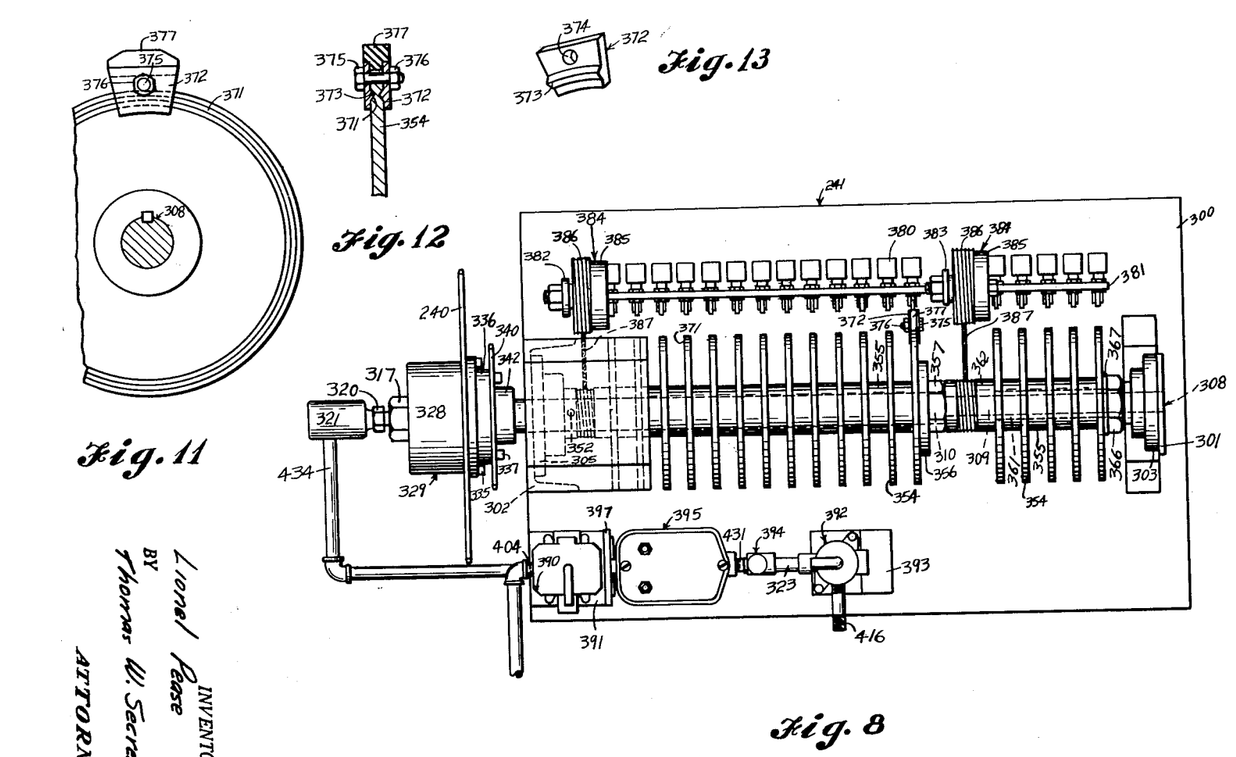
FIGURE 8 is an upper plan view of the control unit for the power takeoff unit.
FIGURE 11 is a fragmentary elevation view of the face of one of the disks with the actuating plate on the disk.
FIGURE 12 is a fragmentary elevation of the end of one of the disks with the actuating plate on the disk.
FIGURE 13 is a perspective view of the inner face of the actuating plate and illustrates the inner circular rib.
Figure 9:
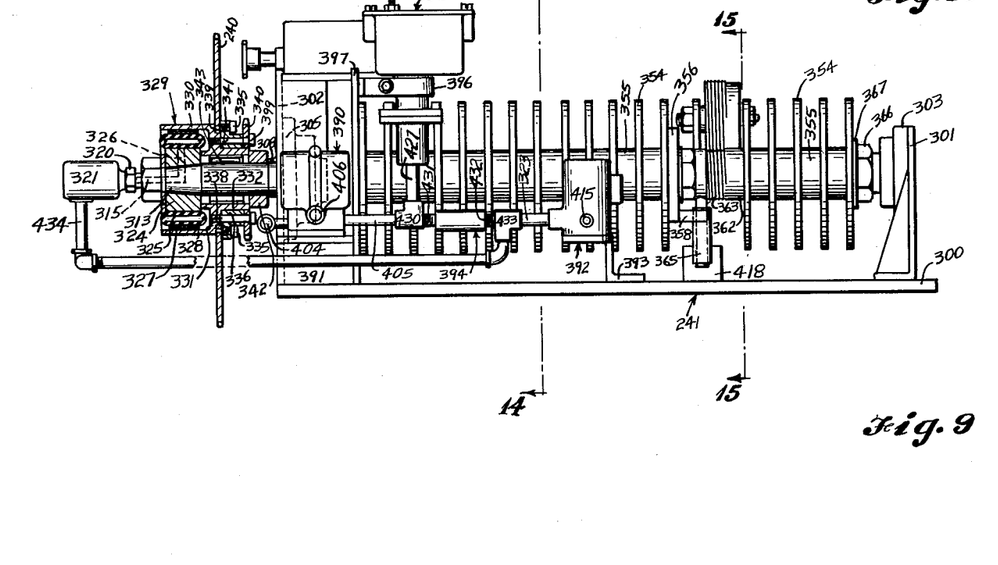
FIGURE 9 is a side elevation view of the control unit.

The control unit 241 comprises a base member 300 which may be a flat, heavy piece of metal in a square or rectangular configuration. Mounted on this base are two spaced-apart pedestals 301 and 302. These pedestals are aligned with each other but near opposite ends of the base. On pedestal 301 is a bearing housing 303 with a bearing 304 and on pedestal 302 is a bearing housing 305 with a bearing 306 therein. Mounted in these bearings is a shaft 308. The shaft at one outer end is reduced in size, approximately one-fourth the length of the shaft, into a small shaft 309. This shaft at its inner end enlarges in diameter into a large shaft 310. At approximately the juncture or meeting place of the shaft 309 and 310, shaft 310 is threaded at 311. The shaft 310 has a longitudinally running keyway 312. The shaft 310 runs through the bearing 306 and projects over one end of the base member 300. At approximately the position the shaft 310 overhangs the platform the shaft becomes smaller in diameter to become shaft 319. At the juncture of shafts 310 and 319 is a shoulder 299. The shaft 319 on its outer end tapers at 313 into a smaller shaft 314. The smaller shaft 314 is tapped at 315 into a longitudinal passageway. At approximately the middle of the taper 313 there is another passageway 316, lateral to the longitudinal axis of the shaft 308, and which meets at the inner end of the passageway 314. The shaft 314 is threaded to receive nut 317. The outer end of the shaft 314 is also threaded, 320, to receive a rotating air coupling 321.

On the outer part of the shaft 308 and overhanging the base 300 is a clutch assembly 329. Pressed onto the tapered shaft 313 is a clutch hub 324. On the perimeter of this clutch hub is an expandable inner clutch member 325 which connects with conduit 316. In the clutch hub 324 is a passageway 326 which connects with conduit 316 in the shaft 313. This conduit 326 connects with the inner part of the clutch member 325. On the perimeter of this clutch member is tread 327. In actuality, this inner clutch member is an expandable rubber tire which with the increase in air pressure or the forcing of air therein, the clutch member expands outwardly. Surrounding the clutch member 325 and the hub 324 is a circular clutch housing 328. This clutch housing is free to rotate around the shaft 319. On its inner end the clutch housing reduces in size into a radial shoulder 331 which in turn is directed inwardly to form a hub 332. On the shoulder and the inner part of the clutch housing 330 is a recessed region 333 for receiving sprocket 240. The sprocket is attached to the recess 333 by means of bolts 335. On the hub 332 is a bushing 336. This bushing 336 has a number of longitudinal passageways 322 therethrough to receive bolts 337. Also, on the collar 322 is a sprocket 340 having passageways 339 aligned with the passageways 322 for receiving the bolts 337. The shoulder 331 has a number of tapped openings 338 for receiving these bolts 337. The bushing 336 has passageways 341 therein and is attached to the circular clutch housing 328 by dog point screws 335. In sprocket 240 are reamed holes. The dog point screws 335 project through the passageways 341, the reamed holes and are received in the tapped openings in the radial shoulder 331 and thereby firmly position the sprocket on the clutch housing. In this assembly the bushing 336 functions as a spacer between sprockets 240 and 340.

Pressed onto the shaft 319 is a collar 342. This collar is positioned between the inner end of the hub 332 and the shoulder 299, and functions as a spacer for the clutch housing 329 with respect to the end of the shaft 308. The hub 324 and the collar 342 prevent the longitudinal movement of the clutch housing 328 on the shaft and the roller bearing 343 allows the clutch housing to freely rotate on the shaft.

On the inner end of the bearing 305 is a hub 350 which is provided with a spiral groove 351. This hub is secured to shaft 310 by means of a dowel pin 352 which runs through a radial passageway 358 in the hub 350 and an aligned radial passageway 369 in the shaft 310.

Figure 10:
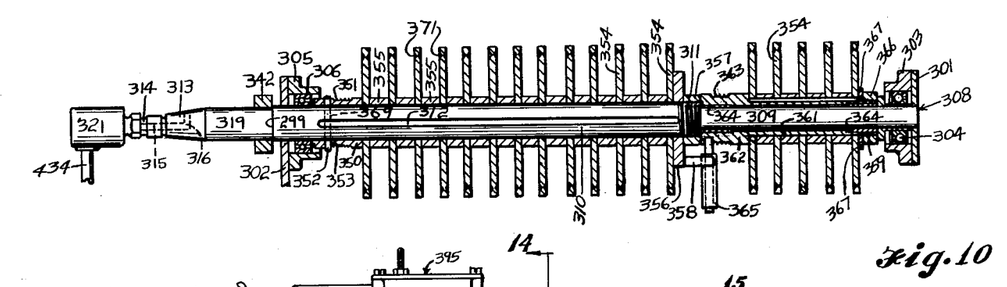
FIGURE 10 is a side elevation view of the switch actuating disks mounted on two separate rotatable shafts.

On the shaft 310 are a number of spaced-apart circular disks 354. Between each disk is a spacer or bushing 355 which encircles shaft 310. On the outer end of the shaft 310 is a heavy circular plate 356 which is smaller in diameter than the disks 354. The inner end of the shaft 310 is threaded at 311. This disk 356 is forced tightly against the last disk 354 by means of nut 357 screwed onto threads 311. This nut 357 by forcing against plate 356 forces together all of the spacer elements 355 and the disk 354 so that they are tightly pressed one against another. In this manner upon the rotation of one disk or spacer element all of them will rotate. On the heavy metal plate 356, and directed outwardly away from the last disk 254 substantially parallel to shaft 310 is a longitudinal pin 358. This pin is integral with the disk 356 and with said disk rotating the pin also rotates. These disks, spacer elements, and plate are keyed to the shaft 310 by means of key 360 in keyway 312.

On the shaft 309 is a similar arrangement of disks 354 and spacers 355. Immediately surrounding the shaft 309 is a sleeve 361. This sleeve on the inner end expands into a hub 362 having spiral grooves 363 on the outer surface. On the two ends and interior of the sleeve are pressed two bronze bushings 364. The circular disk 354 and the spacers 355 encircle the sleeve 361 which is free to rotate on shaft 309. Secured to the inner end of the hub 362 is a radial pin 365.

The outer exterior end of the sleeve is threaded at 359 to receive a nut 366. Between the outermost circular disk 354 and the nut 366 is a small circular plate 367. The nut 366 is screwed onto the threaded outer end of the sleeve 361 so as to force tightly together the disks 354 and the spacers 355. A key 370 on sleeve 361 connects with the spacers 355 and the disks 354 so as to substantially unite sleeve 361 and the spacers and disks.

Turning now to the disk 354 and the function it performs, it is seen that the same has a circular groove 371 on each face of the disk near the circumference of the same. This circular groove is in the cross-section of a triangular configuration. This groove is for positioning plate 372. This plate has a raised circular rib 373 on its inner face and which rib in cross-section is of a triangular configuration to cofit with groove. Also, there is a lateral passageway 374 in each plate. Two of these plates 372, they can be considered to be mirror images, are held together by a bolt 375 and a nut 376. Referring to the drawings, it is seen that a plate is on each side of the disk with the rib 373 in the groove 371 for each plate. The bolt 375 and the nut 376 hold these together on the circumference of the disk. These two plates clamp between them a nylon or Teflon block 377. This block, as is realized, is an insulator.

Figure 14:
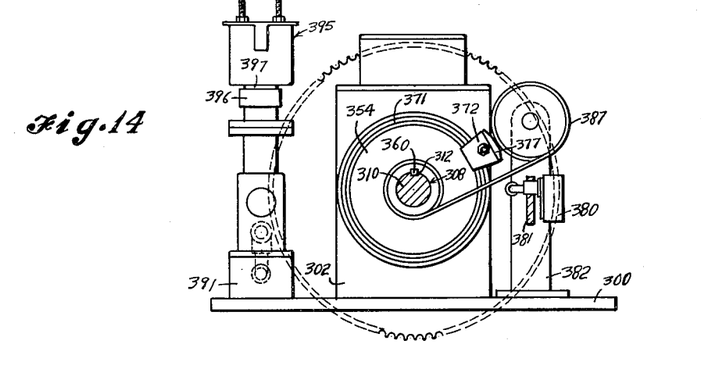
FIGURE 14 is a lateral, vertical, cross-sectional view taken on line 14—14 of FIGURE 9, and is a fragmentary end elevation view of the control unit and illustrates the position of one of the actuating plates on a switch actuating disk prior to contacting a switch.

This block contacts a microswitch 380. There are a series of these microswitches, one for each circular disk 354. These microswitches are mounted on a rectangular bar 381 which is secured in bearings on pedestals 382 and 383. Mounted on top of the pedestals 382 and 383 are spring return mechanisms 384. The spring mechanism comprises a spring having an inner end secured to the pedestal and an outer end secured to a spring housing 385. This spring housing is spirally grooved at 386 to receive a cable or rope 387. Upon the turning of the shaft 310 and/or the shaft 309 the spring is wound or tightened by means of the cable. Then, the spring tends to unwind so as to return the shaft 310 and/or the shaft 309 to its original position. This will be more particularly described in the manner of operation of the entire apparatus.

Also mounted on the base 300 are a number of switches and valves. 390 refers to a three-way valve which is normally closed. This valve is mounted on support 391. 392 is a two-way normally open valve which is mounted on support 393. Interposed between valves 390 and 392 is a check valve 394. Reference numeral 395 is for a pressure switch which is held in position by bracket 396 on pedestal 397.

Figure 17:
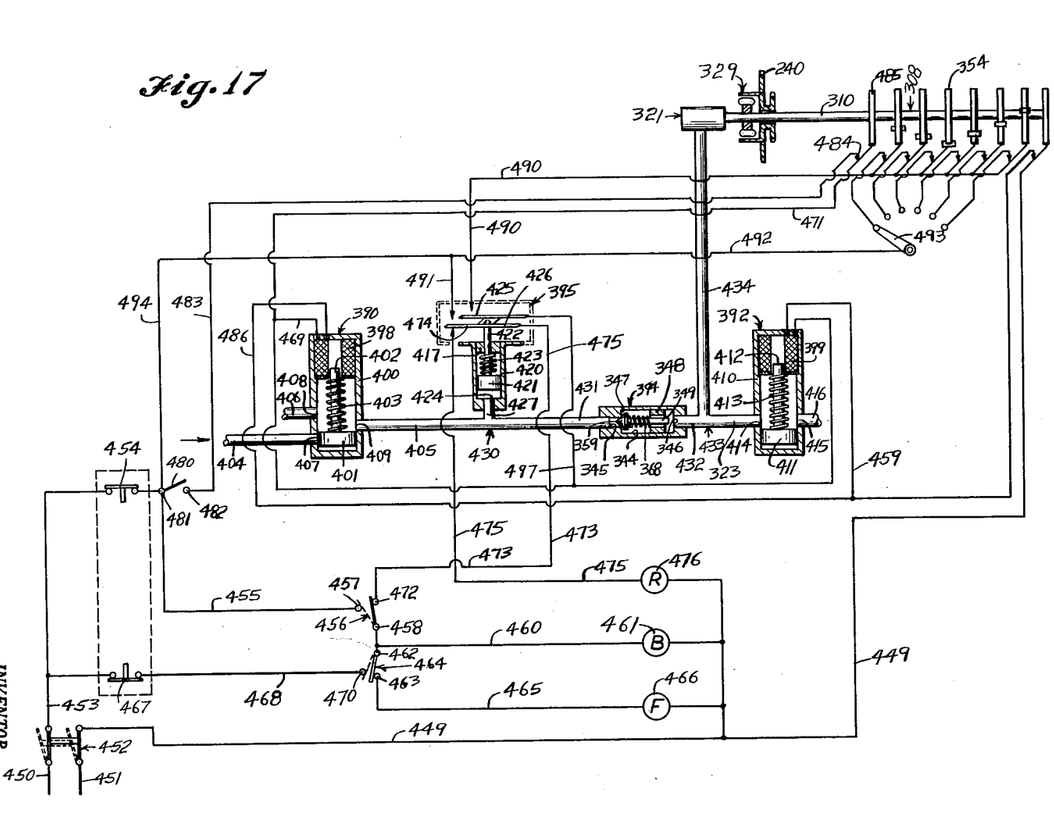
FIGURE 17 is a schematic wiring diagram of the power takeoff unit as applied to a sawmill setworks with the control unit arranged for manual operation.

390 is the normally closed freeway solenoid valve comprising a cylinder 400, in which is mounted a piston 401 having a plunger 402 and a spring 403 urging the valve in the closed position. 404 is the inlet pipe leading to port 407, 405 is the outlet pipe from port 409, and 406 is the exhaust pipe from port 408. Reference numeral 398 represents the coil.

392 is a two-way normally open solenoid valve comprising a cylinder 410, a spring-loaded piston 411, a plunger 412 and a spring 413. The spring normally urges the valve in an open position. The inlet port is 414 with pipe 323 therein and the exhaust port is 415 with pipe 416 therein. Reference numeral 399 represents the coil.

395 is a pressure-operated switch comprising a cylinder 420, a piston 421, the plunger 422, and a spring 423. The spring bears against plug 417 in cylinder 420 and normally urges the piston downward against the inlet port 424. Switch plates or leaves 425 and 426 ride on the plunger 422. The outlet pipe 405 of valve 390 connects with a T-member 430 which in turn connects with pipe 427, the inlet pipe to the pressure switch 395. This T-member 430 also connects with the check valve 394 by means of a pipe 431.

The check valve 394 comprises a cylindrical chamber 344 having an inlet 345 and an outlet 346. At the juncture of the inlet 345 and the chamber 344 there is a shoulder 347. In the cylindrical chamber is a disk 348 capable of moving longitudinally therein. This disk carries a plunger 349 and which plunger carries a conical head 359. Positioned on the plunger 349 and between the head 359 and the disk 348 is a spring 368. The pipe 431 connects with the inlet 345 and pipe 432 connects with the outlet 346.

The outlet of the check valve 394 connects by means of the pipe 432 with a T-member 433. The T-member 433 connects with the inlet 414 of the switch 392 by means of pipe 323. The T-433 also connects with pipe 434 which leads into rotating rotary air connector 321. As previously stated the rotary air connector 321 feeds into air clutch member 325 which makes it possible to interconnect circular clutch housing 328 with the shaft 313.

Turning now to the operation of the setworks and the manner in which the control unit 241 enters into said operation, referring to the drawings again, and by way of recall or refresher, the sprocket 240 of the control unit is connected by means of chain 238 with sprocket 237 on the set shaft 230. The operation of the setworks may be manually controlled. With manual control the three-way valve 390 is in normally closed position, see FIGURE 17. In the wiring diagram the positive wire is 450 and the negative or common wire is 451. The positive wire 450 connects with the double-pole master switch 452 and upon leaving this master switch is designated 453, and the negative wire 451 upon leaving the master switch is designated 449.

*Manual Operation*

For forward manual operation the rear or reverse limit switch 467 is closed and the forward limit switch 454 is closed. The electric power passes through the forward limit switch 454 and then through 455 wire to the manual set switch 456, in phantom. The switch 456 bridges contacts 457 and 458. From contact 458 the power passes through wire 460 to brake solenoid 461 which actuates the air clutch in the brake by means of suitable piping and rotating air coupling 88, see FIGURE 2. The brake solenoid is a normally open valve so that when it is energized it releases the air in the brake assembly 29 or lets the air pressure in the brake decrease. The electric power in switch 464 flows between contacts 462 and 463, in solid. From contact 463 it passes through wire 465 to forward clutch solenoid 466 which, by means of suitable piping and rotating air couplings, can control the operation of clutch assembly 27, see FIGURE 2. As previously stated, this connects clutch housing 48 with the intermediate shaft 40 because the actuation of the forward solenoid 466 permits the air pressure in the expandable clutch member 60 to build up so as to engage the housing 48 and the intermediate shaft 40. As previously stated the pinion gear 41 on shaft 40 drives bull gear 147 on output shaft 140 in the forward direction.

For operating the setworks manually in reverse the switch 456 is placed across contacts 472 and 458, and the reverse limit switch 467 is closed so that the electric power passes through wire 468 to contact 470. The contacts 470 and 462 are bridged by switch 464, in phantom. Also, contacts 458 and 472 are bridged by switch 456, in solid line. The power upon passing through switch 464 also passes through the brake solenoid to release the same as previously described. Also, the power passes through switch 456 and through wire 473 to pressure switch 395. In this pressure switch the wire 473 contacts switch element 474 which in turn connects with wire 475 leading to reverse solenoid 476 which, by means of suitable piping can control the actuation of the associated reverse clutch.

As previously stated with the reverse solenoid actuated the forward solenoid is not actuated so that the forward clutch housing 27 is not in contact with the intermediate shaft 40. Also, the brake is not actuated so that the intermediate shaft is free to rotate. The intermediate shaft is driven, by means of recapitulation, through the input shaft 30, pinion gear 34, idler gear 132 and gear 70 which is connected with the reverse clutch housing 76. Upon the actuation of the expandable member 82 of this reverse clutch assembly 28 this housing is in contact with the intermediate shaft. As previously stated the pinion gear 41 on shaft 40 drives bull gear 147 on output shaft 140 in the reverse direction.

*Automatic Operation*

Turning now to the operation of the preset automatic system in the forward direction, the electric power passes through the forward limit switch 454 and then to the preset switch 480, bridging contacts 481 and 482. From there it passes by means of wire 483 to reset switch 484. The switch 484 is controlled by circular disk 485 on shaft 310. In order for this system to operate at the completion of each setting operation, it is necessary for the shaft to return to its original position which means that the circular disk 485 returns to its original position. Upon the returning of the disk 485 to its original position the switch 484 is closed, thereby making it possible to complete a circuit at a later date. If the switch 484 is not closed the system will not function. In this regard this reset switch is actually a safety device. The switch 484 contacts wire 471 which contacts with wire 469 which leads into solenoid 390. Upon the solenoid 390 being actuating, the normally three-way closed valve, see FIGURE 17, is opened, see FIGURE 18, to permit air to be forced into the solenoid valve 390 through pipe 404 and inlet 407. With the opening of this valve the exhaust port 408 is closed by means of piston 401 overlying the outlet port 408. Also, upon leaving the solenoid valve 390, the power flows through wires 486 and 459 to the two-way normally opened solenoid valve 392, see FIGURE 17. This solenoid valve is energized so as to close the exhaust port 415. With the air entering the solenoid valve 390 and the two-way valve closed the fluid pressure in the system increases so that the pressure switch 395 is actuated. The switch elements 425 and 426 are placed in contact with wires 490 and 491, respectively. Wire 491 connects through wire 492 with switch selector element 493. The wire 490 connects with all of the set switches 380 and through these with 493. Also, with the increase in air pressure in the solenoid valve 390 and the system the air pressure increases in expandable clutch member 325 in clutch assembly 329. 325 connects with shaft 310 so that the clutch 325 interconnects with shaft 310 and the clutch housing 328. This clutch housing, as will be recalled, connects with sprocket 240.

As a sidelight the pressure switch 395 has the tension spring 423 which does not allow it to open until after the clutch assembly 329 has been activated. This time lag assures that there is no mis-setting of the system. After the pressure switches are closed the preset circuit is activated so as to send power to the forward clutch solenoid by means of forward limit switch 454, wire 494, contact 491, switch element 426, wire 473, switch 456 between contacts 472 and 458, switch 464 between 462 and 463 so as to put power to the forward clutch solenoid 466 and to the brake solenoid 461 through 460. As previously stated with the energization of the brake solenoid 461 the brake assembly 29 is relaxed so that the intermediate shaft 40 is free to rotate and with the energization of the forward solenoid 466 the intermediate shaft 40 is placed in contact with the input shaft 30 through gears 33 and 42. In turn the pinion gear 41 on shaft 40 drives output shaft 141 in a forward direction through bull gear 147.

Figure 18:
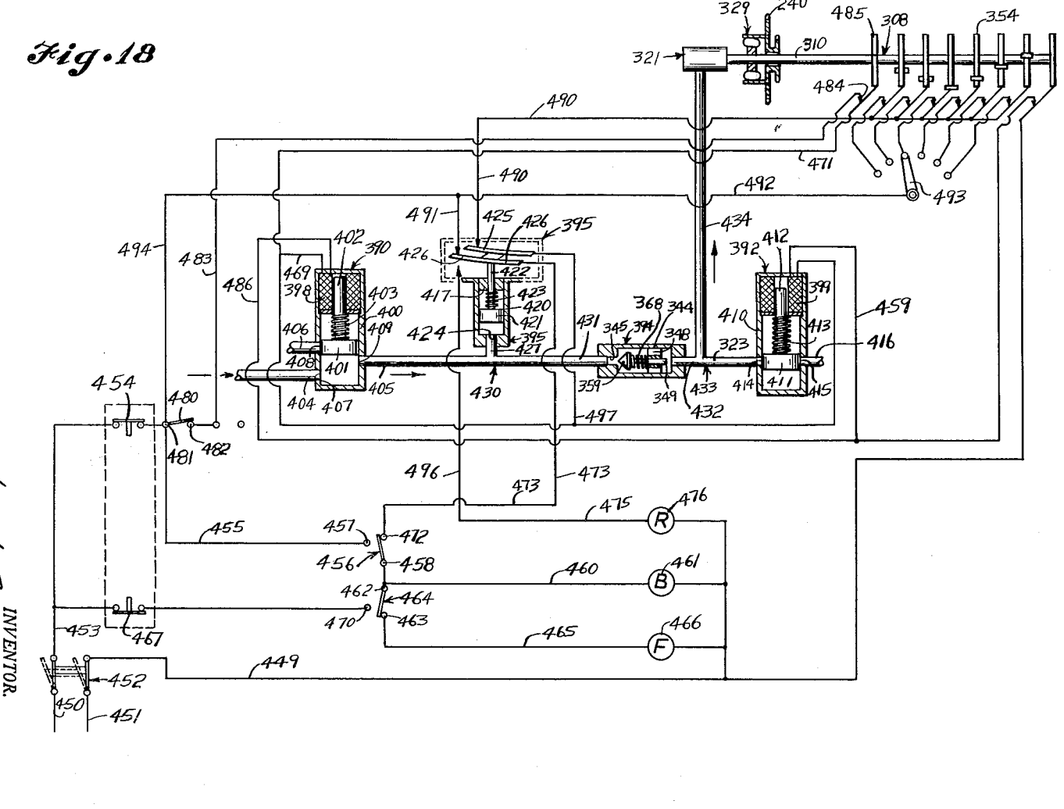
FIGURE 18 is a schematic wiring diagram of the power takeoff unit as applied to a sawmill setworks with the control unit arranged for automatic preset operation.

The reset switch is now opened and to keep the normally closed solenoid valve open and the normally open valve closed, power is now through 494 wire to the selector switch 493. From the selector switch the power flows through a pre-selected set limit switch, as depicted in FIGURE 18, the number three switch, and then by wire 490 to a second pressure switch contact and from there through wire 497 to the solenoid 399 and also to the solenoid 398. This places the setworks into motion as the brake is released and air is applied to the setworks clutch assembly 27.

When the previously selected set limit switch is opened it opens the circuit allowing the normally closed valve 400, which is now open, to close. This seals off the source of air pressure from the system. Also, the normally opened solenoid operated valve 392, which is now closed, is allowed to open so that the air in the system can exhaust. The check valve 394, as shown in the manifold system, keeps the air from the clutch assembly 329 from entering the pressure switch line so that the pressure switch line, which has very little air in it, exhausts through the normally closed valve 390. Because of the small amount of air in the pressure switch the pressure switch exhausts before the air clutch exhausts. The clutch exhausts through the normally open solenoid valve 392. This sequence of operations insures that each set is completed before the clutch is disengaged.

Returning now to the operation of the control unit, it is possible to better understand at this time the operation of the circular disk 354. The size of the cut on the log is determined by the positioning of the switch actuators 377 on the circular disk 354. With regard to the position of these circular disks and actuators with respect to shaft 310 it is possible to have a large number of cuts. As is readily realized the angle of rotation of the shaft 310 (also shaft 309) is directly proportional to the size of the cut of the log. For cuts of a much larger width than it is possible to obtain with the limit switches controlled by the disks on shaft 310, it is possible to resort to the circular disks 354 and the actuators on shaft 309. More particularly, the sleeve 361 does not rotate with the first revolution of the shaft 310 or the shaft 309 (as by way of recall the sleeve 361 is not permanently attached or integral with the shaft 309). In order to rotate the disks 354 on the sleeve 361, it is necessary that the shaft 310 make substantially a complete revolution, approximately 330 to 340 degrees, see FIGURES 15 and 16. The arm 358 on heavy plate 356 rotates with the rotation of the shaft 310. Upon rotating through approximately 330–340 degrees this arm contacts the backface or pin 365 which is integral with the inner part of the sleeve 361. As is readily realized with the further rotation of the shaft 310, the finger 358 forces the pin 365 to also rotate which in turn forces the sleeve 361 and circular disks 354 thereon to rotate. By adjusting the angular position of the switch actuators 377 on these disks 354 it is possible to predetermine the width of a cut.

Figure 15:
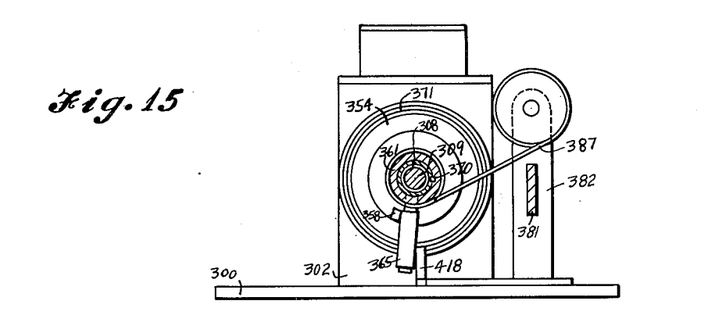
FIGURE 15 is a lateral, vertical cross-sectional view taken on line 15—15 of FIGURE 9, and is a fragmentary end elevation view of the control unit and shows a pin associated with a first rotatable shaft in a rest position and a radial pin associated with a rotatable sleeve in a rest position.
Figure 16:
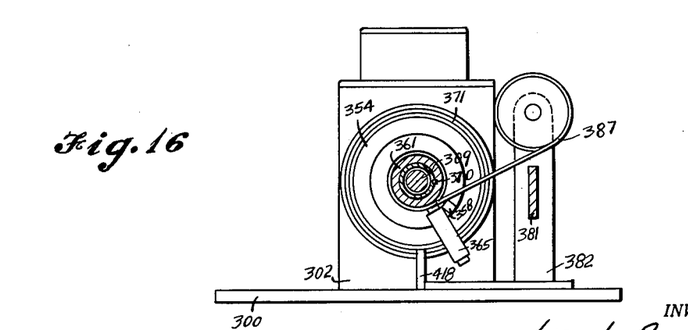
FIGURE 16 is a fragmentary end elevation view of the control unit and shows a pin associated with the first rotatable shaft bearing against a radial pin associated with the rotatable sleeve, said pin having rotated through an angle of approximately 630° and having rotated said radial pin through an angle of approximately 270°.

Attached to the base 300 and projecting upwardly therefrom, and aligned with the pin 365, is a stop 418. This stop functions as a zero positioner for the sleeve 361 and also function to limit the forward rotation of the sleeve 361.

Although this power takeoff unit has been presented by its separate members and then the members combined into an operating combination as depicted in a sawmill setworks it is to be realized that this power takeoff unit may be employed in many other instances. More particularly, this power takeoff unit may be employed as a timing device because of the control unit 241. This power takeoff unit translates motion into distance, either linear or rotary. Because of this ability the takeoff unit may be used where accurate timing is essential. Examples of this are in a paper cutting-machine, veneer clippers in a plywood mill, metal shears where metal must be cut to certain lengths, and lumber stockers. Actually, this takeoff unit is adaptable to many forms of automation where the distance traveled must be accurately determined and in many instances predetermined.

While I have herein shown and described the invention with sufficient detail to enable those skilled in the art to understand the mode of construction and the principles involved, it is to be understood that there is no intentional limitation herein to the specific forms and precise details of construction of the invention shown and described, except as expressly defined by the appended claims, and it is to be further understood that various changes and modifications of such construction may be resorted to without departing from the spirit of the invention or the benefits derivable therefrom.

What I claim is:

1. A sawmill setworks comprising in combination a set shaft, a reversible power transmission mechanism and a control unit therefor, said mechanism comprising an input shaft, an intermediate shaft, an output shaft, means interconnecting the input shaft, the intermediate shaft and the output shaft for rotating the output shaft in a first direction, means interconnecting the input shaft, the intermediate shaft and the output shaft for rotating the output shaft in a second direction, said first and second directions being opposed, means interconnecting the output shaft and the set shaft in order for the former to drive the latter, said control unit comprising a main rotating shaft, a support means juxtapositioned with respect to said shaft, a plurality of switch means comprising switches and actuators therefor, said plurality of switch means being referred to as a first part of the switch means and a second part of the switch means, a plurality of members on the rotating shaft, a first part of the switch means being on one of the members, a second part of the switch means being on the support, means interconnecting the main rotating shaft and the reversible power transmission mechanism so that with the operation of said mechanism and the rotation of said rotating shaft one of the first part of the switch means on one of the members contacts with and coacts with one of the second part of the switch means on the support, and means interconnecting the switch means and said transmission mechanism so that with the contacting of said first part and said second part the transmission mechanism is removed from driving relationship with the set shaft.

2. A sawmill setworks comprising in combination a set shaft, a reversible power transmission and a control unit therefor, said mechanism comprising an input shaft, an intermediate shaft, an output shaft, means interconnecting the input shaft and the intermediate shaft for rotating the intermediate shaft in a first direction, means interconnecting the input shaft and the intermediate shaft for rotating the intermediate shaft in a second direction, said first and second directions being opposed, means interconnecting the intermediate shaft and the output shaft for rotating the output shaft, means interconnecting the output shaft and the set shaft in order for the former to drive the latter, said control unit comprising a main rotating shaft, a support means juxtapositioned with respect to said shaft, a plurality of switch means being referred to as a first part of the switch means and a second part of the switch means, a plurality of members on the rotating shaft, a first part of the switch means being on one of the members, a second part of the switch means being on the support, means interconnecting the main rotating shaft in the control unit and the output shaft of the mechanism so that with the operation of said mechanism and the rotation of said main rotating shaft one of the first part of the switch means on one of the members contacts with and coacts with a second part of the switch means on the support, means interconnecting the switch means and said transmission mechanism so that with the contacting of said first part and said second part to remove the input shaft from driving relationship with said output shaft, means urging the main rotating shaft in the control unit to return to its initial position, and means interconnecting the main rotating shaft in the control unit when in its initial position and said mechanism to permit the output shaft to rotate.

3. A sawmill setworks comprising in combination a set shaft, a first means for rotating the set shaft, a control unit, said control unit having a main rotating shaft, means interconnecting the set shaft and the main rotating shaft to rotate the main rotating shaft in conjunction with the set shaft, a support means juxtapositioned with respect to said rotating shaft, a plurality of switch means and actuators therefor, said plurality of switch means being referred to as a first part of the switch means and a second part of the switch means, a plurality of members on the rotating shaft, a first part of the switch means being on one of the members, a second part of the switch means being on the support, with the rotation of the main rotating shaft one of the first part of the switch means on one of the members contacting with and coacting with one of the second part of the switch means on the support, and means interconnecting the switch means and the first means so that with the contacting of said first part and said second part of the first means is removed from a driving relationship with a driven means.

4. A reversible power transmission mechanism comprising in combination an input shaft, an intermediate shaft, an output shaft, means interconnecting the input shaft, the intermediate shaft and the output shaft for rotating the output shaft in a first direction, means interconnecting the input shaft, the intermediate shaft and the output shaft for rotating the output shaft in a second direction, said first and second directions being opposed and a control unit for regulating the rotation of the output shaft, said control unit comprising in combination a main rotating shaft, a support means juxtapositioned with respect to said shaft, a plurality of switch means comprising switches and actuators therefor, said plurality of switch means being referred to as a first part of the switch means and a second part of the switch means, a plurality of members on the rotating shaft, a first part of the switch means being on one of the members, a second part of the switch means being on the support, means interconnecting the main rotating shaft in the control unit and the reversible power transmission mechanism so that with the operation of said mechanism and the rotation of said main rotating shaft one of the first part of the switch means on one of the members contacts with and coacts with one of the second part of the switch means on the support, and means interconnecting the switch means and said transmission mechanism so that with the contacting of said first part and said second part the transmission mechanism is removed from a driving relationship with a driven means.

5. A reversible power transmission mechanism comprising in combination an input shaft, an intermediate shaft, an output shaft, means interconnecting the input shaft and the intermediate shaft for rotating the intermediate shaft in a first direction, means interconnecting the input shaft and the intermediate shaft for rotating the intermediate shaft in a second direction, said first and second directions being opposed, means interconnecting the intermediate shaft and the output shaft for rotating the output shaft, and a control unit for regulating the rotation of the output shaft, said control unit comprising in combination a main rotating shaft, a support means juxtapositioned with respect to said shaft, a plurality of switch means comprising switches and actuators therefor, said plurality of switch means being referred to as a first part of the switch means and a second part of the switch means, a plurality of members on the rotating shaft, a first part of the switch means being on one of the members, a second part of the switch means being on the support, means interconnecting the main rotating shaft in the control unit and the output shaft of the mechanism so that with the operation of said mechanism and the rotation of said main rotating shaft one of the first part of the switch means on one of the members contacts with and coacts with one of the second part of the switch means on the support, means interconnecting the switch means and said transmission mechanism so that with the contacting of said first part and said second part to remove the input shaft from driving relationship with said output shaft, means urging the main rotating shaft in the control unit to return to its initial position, and means interconnecting the main rotating shaft in the control unit when in its initial position and said mechanism to permit the output shaft to rotate.

6. A control unit comprising in combination a main rotating shaft, a support means juxtapositioned with respect to said shaft, a plurality of switch means comprising switches and actuators therefor, said plurality of switch means being referred to as a first part of the switch means and a second part of the switch means, a plurality of members on the rotating shaft, a first part of the switch means being on one of the members, a second part of the switch means being on the support, with the rotation of the main rotating shaft one of the first part of the switch means on one of the members contacting with and coacting with a second part of the switch means on the support, and means urging the shaft to return to its initial position and means arresting the further rotation of the shaft after it returns to its initial position.

7. A control unit comprising in combination a main rotating shaft, a support means juxtapositioned with respect to said shaft, a plurality of switch means comprising switches and actuators therefor, said plurality of switch means being referred to as a first part of the switch means and a second part of the switch means, a plurality of members on the rotating shaft, a first part of the switch means being on one of the members, a second part of the switch means being on the support, and with the rotation of the main rotating shaft one of the first part of the switch means on one of the members contacting with a second part of the switch means on the support, upon the contacting of the first part of the switch means with the second part of the switch means the rotating shaft ceasing to rotate, means urging the shaft to return to its initial position and means arresting the further rotation of the shaft after it returns to its initial position.

8. A control unit comprising in combination a main rotating shaft, a support means juxtapositioned with respect to said shaft, a plurality of switch means comprising switches and actuators therefor, said plurality of switch means being referred to as a first part of the switch means and a second part of the switch means, a plurality of members on the rotating shaft, a first part of the switch means being on one of the members, a second part of the switch means being on the support, and with the rotation of the main rotating shaft one of the first part of the switch means on one of the members contacting with a second part of the switch means on the support, said member comprising a circular disk, said disk having a circular groove in each of its faces, a clamp having a circular ridge for cofitting in the circular groove, a bearing member designed for cofitting between the two clamps, and means to hold together the two clamps and said bearing member therebetween with the circular ridges of the clamps in the circular grooves of the disk.

9. A control unit comprising in combination a first rotating support means, a stationary support means juxtapositioned with respect to said first rotating support means, a second rotating support means, a plurality of switch means comprising switches and actuators therefor, said plurality of switch means being referred to as a first part of the switch means and a second part of the switch means, a plurality of members on the first and second rotating support means, a first part of the switch means being on one of the members, a second part of the switch means being on the rotating support means, a first actuating member associated with the first rotating support means, a second actuating member associated with the second rotating support means, said first rotating support means in a successive revolution causing said second rotating support means to rotate by means of the first actuating member contacting the second actuating member, with the rotation of the rotating support means one of the first part of the switch means on one of the members contacting with and coacting with one of the second part of the switch means on the stationary support means upon the contacting of the first part of the switch means with the second part of the switch means, the rotating support means ceasing to rotate, and means urging the rotating support means to return to the original position and means arresting the further rotation of the rotating support means after returning to the initial position.

10. A control unit comprising in combination a main rotating shaft, a support means juxtapositioned with respect to said shaft, a plurality of switch means comprising switches and actuators therefor, said plurality of switch means being referred to as a first part of the switch means and a second part of the switch means, a plurality of members on the rotating shaft, said members being positioned longitudinally on said shaft, a connecting means interconnecting the rotating shaft and an apparatus to be controlled, means to control the connecting means and said apparatus to cause said rotating shaft to rotate in response to the operation of said apparatus, a first part of the switch means being on one of the members, a second part of the switch means being on the support, and with the rotation of the main rotating shaft one of the first part of the switch means on one of the members contacting with the second part of the switch means on the support, upon the contacting of the first part of the switch means with the second part of the switch means said connecting means ceasing to interconnect the rotating shaft and said apparatus so as to no longer have said rotating shaft rotate in response to said apparatus, means urging the shaft to return to its initial position and means arresting the further rotation of the shaft after it returns to its initial position.

11. A control unit comprising in combination a main rotating shaft, a support means juxtapositioned with respect to said shaft, a plurality of switch means comprising switches and actuators therefor, said plurality of switch means being referred to as a first part of the switch means and a second part of the switch means, a plurality of members on the rotating shaft, said members being positioned longitudinally on said shaft, a clutch means interconnecting the rotating shaft and an apparatus to be controlled, an electrical control means to control the clutch means and to cause said rotating shaft to rotate in response to the operation of said apparatus, a switching mechanism on said rotating shaft, said switching mechanism in the circuit of said electrical control for the clutch means, said rotating shaft must be in its initial position so that said switching mechanism can complete the circuit of said electrical control for the clutch means prior to the clutch means interconnecting the rotating shaft and said apparatus, a first part of the switch means being on one of the members, a second part of the switch means being on the support, and with the rotation of the main rotating shaft one of the first part of the switch means on one of the members contacting with the second part of the switch means on the support, upon the contacting of the first part of the switch means with the second part of the switch means said clutch means ceasing to interconnect the rotating shaft of said apparatus so as to no longer have said rotating shaft rotate in response to said apparatus, means urging the shaft to return to its initial position and means arresting the further rotation of the shaft after it returns to its initial position.

12. A control unit comprising in combination a main rotating shaft, a support means juxtapositioned with respect to said shaft, a plurality of switch means comprising switches and actuators therefor, said plurality of switch means being referred to as a first part of the switch means and a second part of the switch means, a plurality of members on said rotating shaft, said members being positioned longitudinally on said shaft, a fluid actuated clutch interconnecting the rotating shaft and an apparatus to be controlled, an electrical control means for said fluid clutch to regulate the rotation of said shaft with respect to the operation of said apparatus, a switching mechanism on said rotating shaft and in the circuit of said electrical control means, said rotating shaft must be in its initial position so that the switching mechanism will complete the circuit of the electrical control means prior to actuating the fluid clutch to cause the same to interconnect the rotating shaft and said apparatus, a first part of the switch means being on one of the members, a second part of the switch means being on the support, and with the rotation of the main rotating shaft one of the first part of the switch means on one of the members contacting with a second part of the switch means on the support, upon the contacting of the first part of the switch means with the second part of the switch means said electrical control means causing said fluid actuated clutch to no longer interconnect the rotating shaft and the apparatus to be controlled, means urging the shaft to return to its initial position and means arresting the further rotation of the shaft after it returns to its initial position.

References Cited in the file of this patent

UNITED STATES PATENTS

| | | |
|---|---|---|
| 1,462,354 | Pero | July 17, 1923 |
| 2,179,267 | Miller | Nov. 7, 1939 |
| 2,421,206 | Kylin et al. | May 27, 1947 |
| 2,455,547 | Barrett | Dec. 7, 1948 |
| 2,505,221 | Tomlinson | Apr. 25, 1950 |
| 2,577,641 | Wissman | Dec. 4, 1951 |
| 2,786,105 | Pawley et al. | Mar. 19, 1957 |
| 2,844,670 | Witte | July 22, 1958 |
| 2,852,957 | Breitenstein | Sept. 23, 1958 |
| 2,856,044 | Koenig et al. | Oct. 14, 1958 |
| 2,869,390 | Leifer | Jan. 20, 1959 |
| 2,902,874 | Sundt | Sept. 8, 1959 |
| 2,978,553 | Bundy et al. | Apr. 4, 1961 |

FOREIGN PATENTS

| | | |
|---|---|---|
| 104,776 | Sweden | June 16, 1942 |